United States Patent
Muramatsu et al.

(10) Patent No.: US 10,501,125 B2
(45) Date of Patent: Dec. 10, 2019

(54) VEHICLE BODY REAR PORTION STRUCTURE

(71) Applicant: HONDA MOTOR CO., LTD., Minato-ku, Tokyo (JP)

(72) Inventors: Yuki Muramatsu, Wako (JP); Kengo Kishida, Wako (JP); Hirofumi Kikuchi, Haga-gun (JP); Kazutaka Kanezashi, Utsunomiya (JP); Keiichiro Okuyama, Shioya-gun (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/996,601

(22) Filed: Jun. 4, 2018

(65) Prior Publication Data

US 2019/0002031 A1 Jan. 3, 2019

(30) Foreign Application Priority Data

Jun. 30, 2017 (JP) .................................. 2017-129319

(51) Int. Cl.
*B62D 25/08* (2006.01)
*B62D 21/15* (2006.01)
*B62D 27/02* (2006.01)

(52) U.S. Cl.
CPC .......... *B62D 25/087* (2013.01); *B62D 21/15* (2013.01); *B62D 27/02* (2013.01)

(58) Field of Classification Search
CPC ..... B62D 25/087; B62D 21/15; B62D 21/152

USPC ........................... 296/203.04, 193.08, 187.11
See application file for complete search history.

(56) References Cited

U.S. PATENT DOCUMENTS

| 7,568,755 | B2* | 8/2009 | Imada ................. | B62D 21/152 296/187.11 |
|---|---|---|---|---|
| 2005/0073174 | A1* | 4/2005 | Yamaguchi ........ | B60G 15/067 296/203.04 |
| 2015/0137559 | A1* | 5/2015 | Lee ..................... | B62D 25/087 296/193.07 |

FOREIGN PATENT DOCUMENTS

| JP | 2006-088886 | 4/2006 |
|---|---|---|
| JP | 2014-024505 | 2/2014 |
| JP | 2016-175516 | 10/2016 |
| JP | 2017-039332 | 2/2017 |

OTHER PUBLICATIONS

Japanese Office Action for Japanese Patent Application No. 2017-129319 dated Dec. 4, 2018.

* cited by examiner

*Primary Examiner* — Joseph D. Pape
(74) *Attorney, Agent, or Firm* — Amin, Turocy & Watson, LLP

(57) ABSTRACT

A vehicle body rear portion structure includes a rear end panel, a rear side frame, a rear end cross member, a first gusset, and a second gusset. The rear end cross member extends in a vehicle width direction along the rear end panel and is separately disposed above the rear side frame. The first gusset connects the rear side frame to the rear end panel. The second gusset connects the rear side frame to the rear end cross member above the first gusset.

7 Claims, 8 Drawing Sheets

VEHICLE BODY REAR PORTION STRUCTURE

CROSS-REFERENCE TO RELATED APPLICATION

Priority is claimed on Japanese Patent Application No. 2017-129319, filed Jun. 30, 2017, the content of which is incorporated herein by reference.

BACKGROUND OF THE INVENTION

Field of the Invention

The present invention relates to a vehicle body rear portion structure.

Description of Related Art

As a vehicle body rear portion structure, a structure in which left and right rear side frames extend in a front-rear direction of a vehicle body, a rear end panel is provided at rear end portions of the left and right rear side frames, and gussets are provided at joining portions between the rear end portions of the rear side frames and the rear end panel, is known. Since the gussets are provided at the joining portions between the rear end portions of the rear side frames and the rear end panel, the joining portions are reinforced by the gussets (see, for example, Japanese Unexamined Patent Application, First Publication No 2006-88886).

SUMMARY OF THE INVENTION

Incidentally, some vehicle body rear portion structures have a closed cross section extending in a vehicle width direction formed on a rear end panel. The closed cross section of the rear end panel extends to the vicinity of a rear fender.

In this case, it is conceivable to connect a gusset to the closed cross section of the rear end panel. When the gusset is connected to the closed cross section of the rear end panel, rigidity when torsional deformation or the like occurs in the vehicle width direction while the vehicle is traveling can be enhanced.

On the other hand, when a load is input to a rear side frame from the vehicle body rear side due to a light collision, the load input to the rear side frame is transmitted to the rear fender via the closed cross section of the rear side frame. Therefore, it is conceivable that a surface of the rear fender is deformed due to the load transmitted to the rear fender.

As a method for avoiding the deformation of a surface of the rear fender, it is conceivable not to connect the closed cross section of the rear side frame to the gusset. However, when the closed cross section of the rear side frame is not connected to the gusset, it is necessary to devise a measure to enhance rigidity when torsional deformation or the like occurs in the vehicle width direction while the vehicle is traveling.

An aspect of the present invention has been made in consideration of such circumstances, and it is an object of the present invention to provide a vehicle body rear portion structure capable of enhancing rigidity when torsional deformation or the like occurs in the vehicle width direction while a vehicle is traveling, and furthermore, preventing the deformation of a rear fender.

In order to solve the above-described problem, the present invention employs the following aspects.

(1) A vehicle body rear portion structure according to an aspect of the present invention includes a rear end panel, a rear side frame which extends from the rear end panel toward a vehicle body front side, and a rear end cross member which extends in a vehicle width direction along the rear end panel and is separately disposed above the rear side frame, in which a first gusset connecting the rear side frame to the rear end panel and a second gusset connecting the rear side frame to the rear end cross member above the first gusset are provided.

According to the above-described aspect (1), since the first gusset and the second gusset are configured as separate members from each other, the roles of the first gusset and the second gusset can be divided.

That is, when the first gusset is connected to the rear side frame and the rear end panel, it is possible to prevent an impact load input to the rear side frame due to a light collision from being transmitted to the rear end cross member via the first gusset. Therefore, when the load of a light collision is input to the rear end cross member, a rear fender can be prevented from being deformed.

That is, the first gusset can mainly contribute against the impact load input due to a rear collision.

Further, since the second gusset is connected to the rear side frame and the rear end cross member, it is possible to enhance the rigidity of the vehicle body when torsional deformation or the like occurs in the vehicle width direction while the vehicle is traveling. Further, by weakening the rigidity of the second gusset in the front-rear direction, the second gusset can be bent in the front-rear direction of the vehicle body by the impact load input to the rear side frame, and the impact load input to the rear side frame can be prevented from being transmitted in the vehicle width direction along the rear end cross member.

That is, the second gusset can mainly contribute to vehicle rigidity when the vehicle is traveling.

As described above, when roles of the first gusset and the second gusset are divided, rigidity when torsional deformation or the like occurs in the vehicle width direction while the vehicle is traveling can be enhanced, and furthermore, the deformation of (a surface of) the rear fender can be prevented.

(2) In the aspect (1) described above, the second gusset may include two longitudinal beads disposed at an interval in the vehicle width direction and extending in a vertical direction, and an opening provided between the longitudinal beads.

According to the above-described aspect (2), the two longitudinal beads are disposed at an interval in the vehicle width direction and extend in the vertical direction. The longitudinal beads have rigidity secured against bending in the vehicle width direction. Therefore, when torsional deformation or the like occurs in the vehicle width direction while a vehicle is traveling, the relative displacement between the rear side frame and the rear end cross member can be prevented.

Also, the opening is provided between the longitudinal beads. Therefore, rigidity between the longitudinal beads is suppressed due to the opening. That is, the second gusset can be bent in the front-rear direction of the vehicle body by an impact load input to the rear end cross member. Thereby, the impact load input to the rear end cross member can be prevented from being transmitted in the vehicle width direction along the rear end cross member.

(3) In the aspect (2) described above, the second gusset may include a flange connecting the longitudinal beads.

According to the above-described aspect (3), when the longitudinal beads are connected by the flange, the rigidity of the second gusset against torsional deformation in the vehicle width direction can be further enhanced. Thereby, when torsional deformation or the like occurs in the vehicle width direction while the vehicle is traveling, the relative displacement between the rear side frame and the rear end cross member can be further prevented.

(4) In the aspect (3) described above, the second gusset may include a pair of first joining portions joined to the first gusset in the vehicle width direction, and the flange may be connected to the pair of first joining portions.

According to the above-described aspect (4), the pair of first joining portions of the second gusset are joined in the front-rear direction of the vehicle body, and the flange is connected to the pair of first joining portions. Therefore, it is possible to enhance the rigidity of the flange by the pair of first joining portions. That is, the rigidity of the second gusset can be further enhanced against torsional deformation in the vehicle width direction. Thereby, when torsional deformation or the like occurs in the vehicle width direction while the vehicle is traveling, the relative displacement between the rear side frame and the rear end cross member can be further prevented.

(5) In the aspect (3) or (4) described above, the flange may form an edge portion of the opening and be joined to the first gusset from the vertical direction only at the edge portion of the opening.

According to the above-described aspect (5), only the edge portion of the opening in the flange is joined to the first gusset. Therefore, the rigidity of the second gusset in the front-rear direction of the vehicle body can be suppressed with respect to the impact load input to the rear side frame due to a light collision. That is, the second gusset can be bent in the front-rear direction of the vehicle body by the impact load input to the rear side frame. Thereby, the impact load input to the rear side frame can be prevented from being transmitted in the vehicle width direction along the rear end cross member.

Also, when the edge portion of the opening is joined to the first gusset, the rigidity of the flange can be enhanced. Therefore, the rigidity of the second gusset against torsional deformation in the vehicle width direction can be further enhanced. Thereby, when torsional deformation or the like occurs in the vehicle width direction while the vehicle is traveling, the relative displacement between the rear side frame and the rear end cross member can be further prevented.

(6) A vehicle body rear portion structure according to an aspect of the present invention includes a rear end panel, a rear side frame which extends from the rear end panel toward a vehicle body front side, and a rear end cross member which extends in a vehicle width direction along the rear end panel and is separately disposed above the rear side frame, in which a gusset connecting the rear side frame to the rear end cross member is provided, and the gusset includes two longitudinal beads extending in a vertical direction and an opening provided between the longitudinal beads in the vehicle width direction.

According to the above-described aspect (6), the two longitudinal beads are disposed at an interval in the vehicle width direction and extend in the vertical direction. The longitudinal beads have rigidity secured against bending in the vehicle width direction. Therefore, when torsional deformation or the like occurs in the vehicle width direction while a vehicle is traveling, the relative displacement between the rear side frame and the rear end cross member can be prevented by the second gusset.

Also, the opening is provided between the longitudinal beads. Therefore, rigidity between the longitudinal beads is suppressed due to the opening. Therefore, the rigidity of the second gusset in the front-rear direction of the vehicle body can be suppressed with respect to the impact load input to the rear side frame due to a light collision. That is, the second gusset can be bent in the front-rear direction of the vehicle body by the impact load input to the rear side frame.

Thereby, an impact load input to the rear side frame can be prevented from being transmitted in the vehicle width direction along the rear end cross member.

As a result, rigidity when torsional deformation or the like occurs in the vehicle width direction while the vehicle is traveling can be enhanced, and furthermore, the deformation of (a surface of) the rear fender can be prevented.

(7) In the aspect (6) described above, the gusset may include a flange connecting the longitudinal beads.

According to the above-described aspect (7), when the longitudinal beads are connected by the flange, the rigidity of the gusset against torsional deformation in the vehicle width direction can be further enhanced. Thereby, when torsional deformation or the like occurs in the vehicle width direction while the vehicle is traveling, the relative displacement between the rear side frame and the rear end cross member can be further prevented.

(8) In the aspect (7) described above, the gusset may include a pair of first joining portions joined to the rear end panel in a vehicle width direction, and the flange may be connected to the pair of first joining portions.

According to the above-described aspect (8), the pair of first joining portions of the gusset are joined in the front-rear direction of the vehicle body, and the flange is connected to the pair of first joining portions. Therefore, it is possible to enhance the rigidity of the flange by the pair of first joining portions. That is, the rigidity of the gusset can be further enhanced against torsional deformation in the vehicle width direction. Thereby, when torsional deformation or the like occurs in the vehicle width direction while the vehicle is traveling, the relative displacement between the rear side frame and the rear end cross member can be further prevented.

(9) In the aspect (3), (7), or (8) described above, the flange may form an edge portion of the opening, and may be joined to the rear side frame from the vertical direction only at the edge portion of the opening.

According to the above-described aspect (9), only the edge portion of the opening in the flange is joined to the rear side frame.

Therefore, the rigidity of the gusset in the front-rear direction of the vehicle body can be suppressed with respect to the impact load input to the rear side frame due to a light collision. That is, the gusset can be bent in the front-rear direction of the vehicle body by the impact load input to the rear side frame. Thereby, the impact load input to the rear side frame can be prevented from being transmitted in the vehicle width direction along the rear end cross member.

Also, when the edge portion of the opening is joined to the rear side frame, the rigidity of the flange can be enhanced. Therefore, the rigidity of the gusset against torsional deformation in the vehicle width direction can be further enhanced. As a result, when torsional deformation or the like occurs in the vehicle width direction while the vehicle is traveling, the relative displacement between the rear side frame and the rear end cross member can be further prevented.

According to the aspects of the present invention, rigidity when torsional deformation or the like occurs in the vehicle width direction while the vehicle is traveling can be enhanced, and deformation of the rear fender can be prevented.

DETAILED DESCRIPTION OF THE INVENTION

Figure 1:
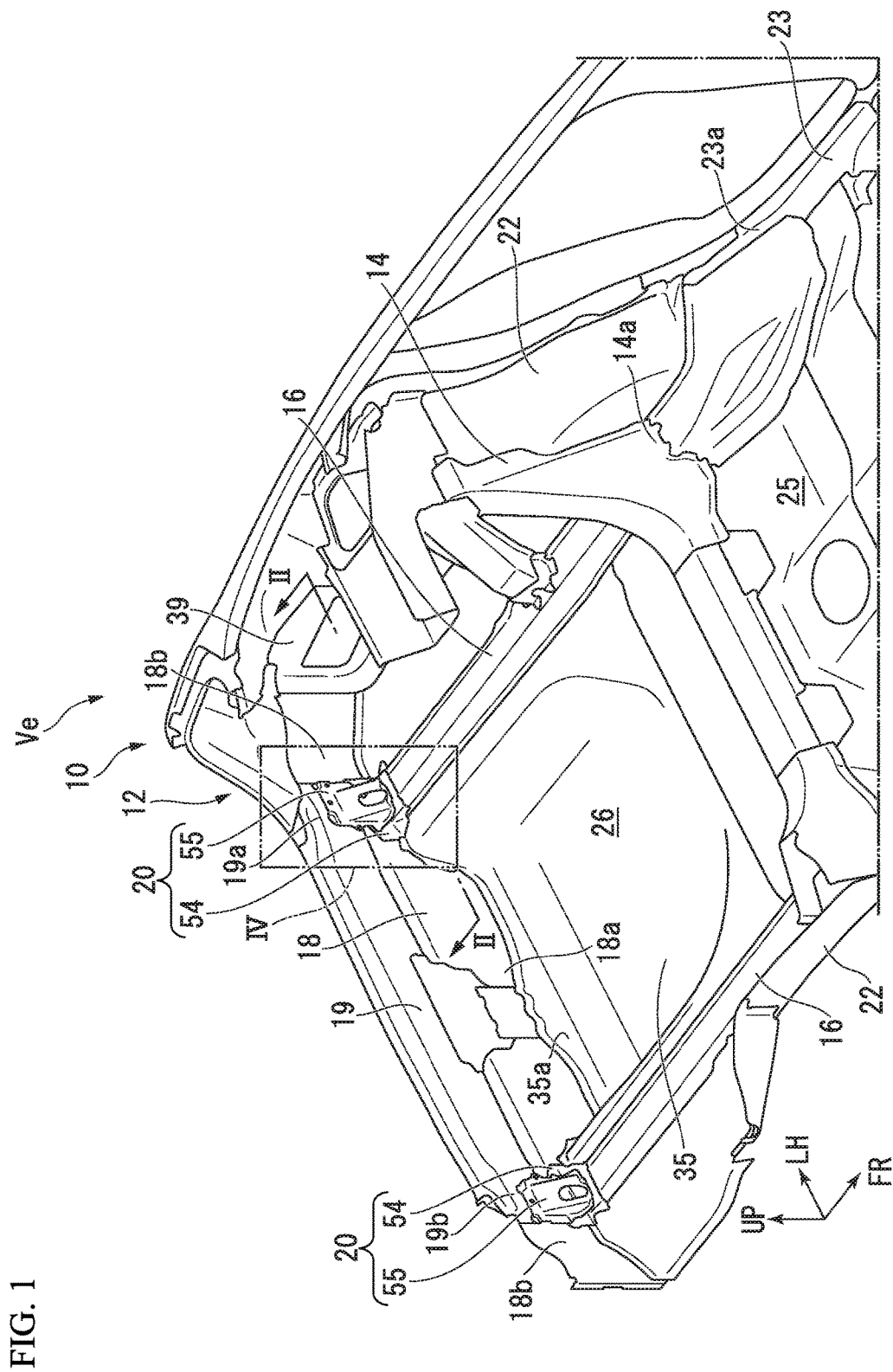
FIG. 1 is a perspective view illustrating a vehicle body rear portion structure in a first embodiment of the present invention.

One embodiment of the present invention will be described on the basis of accompanying drawings. In the drawings, an arrow FR indicates a front side of a vehicle, an arrow UP indicates an upper side of the vehicle, and an arrow LH indicates a left side of the vehicle.

A vehicle body rear portion structure 12 has a substantially bilaterally symmetrical configuration. Therefore, constituent members on the left side and constituent members on the right side will be denoted by the same references, and configurations on the left side will be described and configurations on the right side will be omitted.

First Embodiment

As illustrated in FIG. 1, a vehicle body 10 includes the vehicle body rear portion structure 12 constituting a rear portion of the vehicle body 10. The vehicle body rear portion structure 12 includes a rear bulkhead 14, a rear side frame 16, a rear end panel 18, a rear end cross member 19, and a rear gusset 20.

The rear bulkhead 14 is connected to a rear bumper housing 22 on the left side and the rear bumper housing 22 on the right side. A lower left end portion 14a of the rear bulkhead 14 is attached to a side seal 23 on the left side and a lower right end portion thereof is attached to the side seal on the right side. A vehicle interior 25 is formed in the vehicle body in front of the rear bulkhead 14. In addition, a luggage compartment 26 is formed in the vehicle body behind the rear bulkhead 14.

The rear side frame 16 extends from a rear end portion 23a of the side seal 23 toward a vehicle body rear side.

Figure 2:
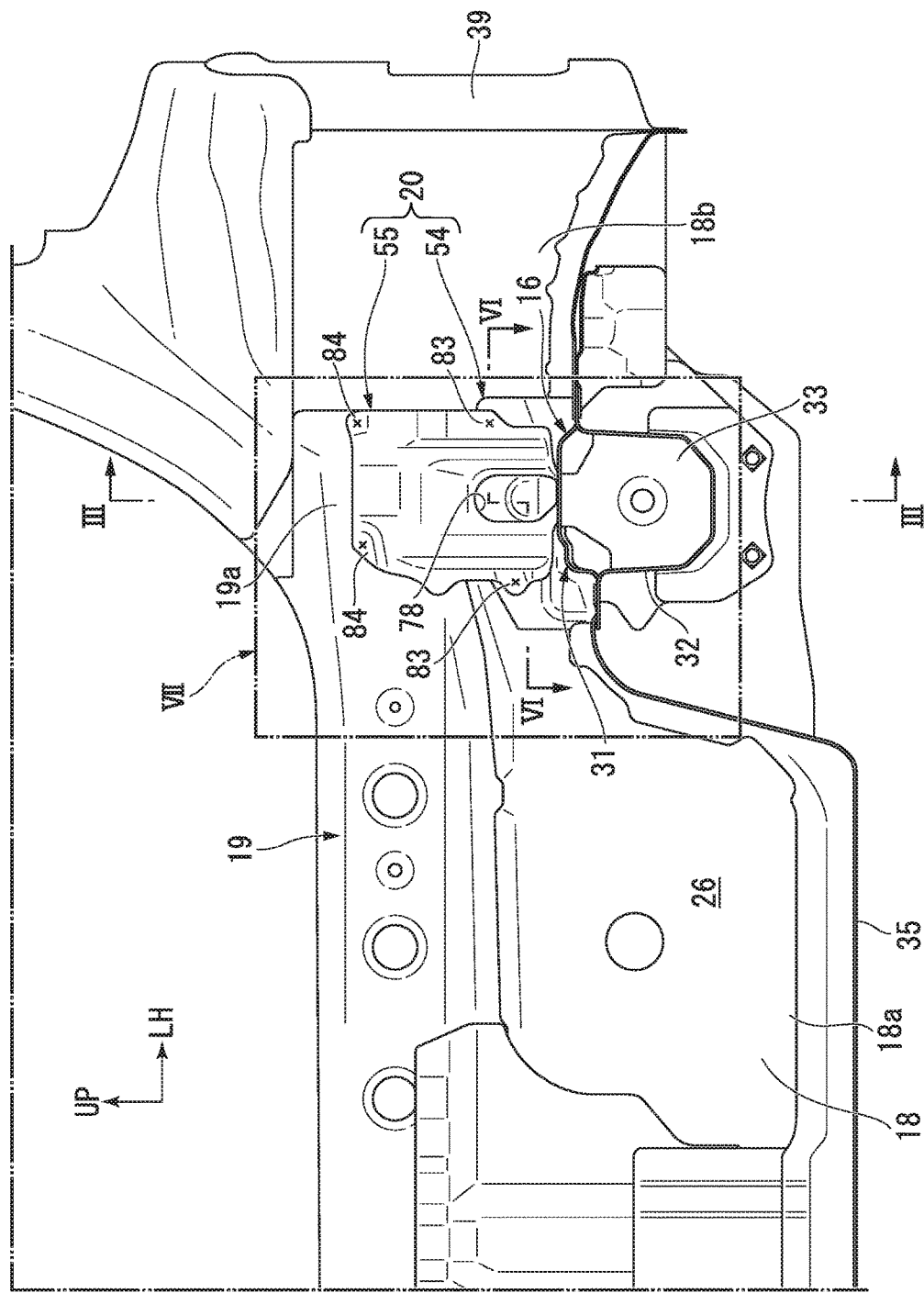
FIG. 2 is a cross-sectional view taken along line II-II of FIG. 1 in the first embodiment of the present invention.

As illustrated in FIG. 2, the rear side frame 16 includes an upper member 31 and a lower member 32. The rear side frame 16 is formed in a closed cross section by joining the upper member 31 to the lower member 32 from above. A bulkhead 33 is attached inside the rear side frame 16. The rear side frame 16 is reinforced by the bulkhead 33. The rear side frame 16 is a member having high rigidity that forms a frame of the vehicle body rear portion structure 12.

Returning to FIG. 1, a rear floor 35 is joined between the rear side frame 16 on the left side and the rear side frame 16 on the right side. A lower end portion 18a of the rear end panel 18 is joined to a rear end portion 35a of the rear floor 35. The rear end panel 18 spans between the left rear side frame 16 and the right rear side frame 16. In other words, the rear side frame 16 extends from the rear end panel 18 toward the vehicle body front side.

A left end portion 18b of the rear end panel 18 is joined to a rear end portion 16a (see FIG. 3) of the rear side frame 16.

A rear end portion of a rear fender 39 is joined to the left end portion 18b of the rear end panel 18.

Figure 3:
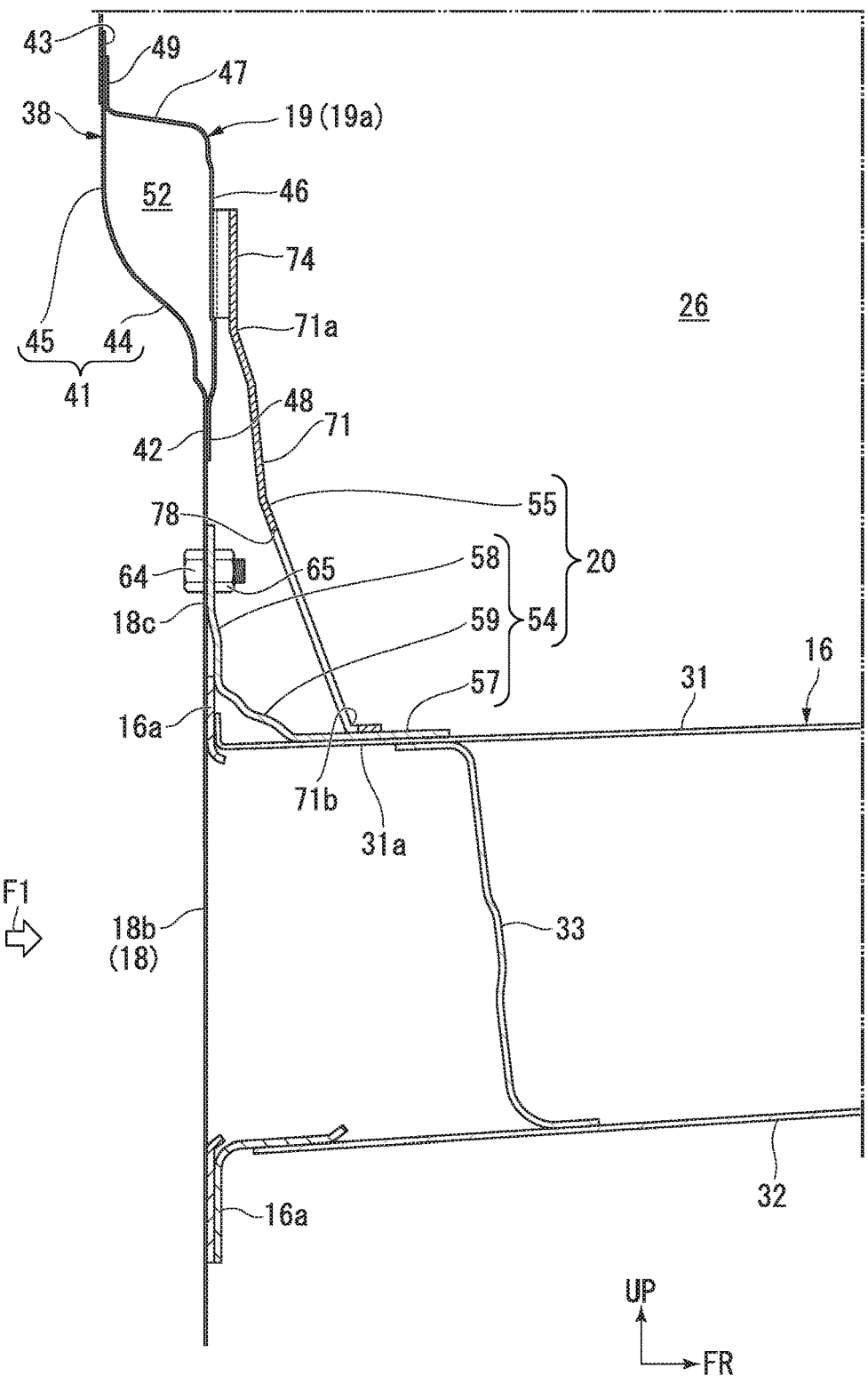
FIG. 3 is a cross-sectional view taken along line of FIG. 2 in the first embodiment of the present invention.

As illustrated in FIG. 3, the rear end cross member 19 is joined to an upper portion 38 of the rear end panel 18 (hereinafter referred to as an end panel upper portion). The end panel upper portion 38 includes a bulging portion 41, a lower joining portion 42, and an upper joining portion 43. The bulging portion 41 includes an inclined wall portion 44 and a vertical wall portion 45.

The inclined wall portion 44 is inclined to have an ascending gradient from the lower joining portion 42 toward the vehicle body rear side. The vertical wall portion 45 extends upward from an upper end portion of the inclined wall portion 44 to the upper joining portion 43. The end panel upper portion 38 bulges toward the vehicle body rear side.

The rear end cross member 19 is joined to the lower joining portion 42 and the upper joining portion 43 of the end panel upper portion 38.

As illustrated in FIG. 1, the rear end cross member 19 extends in a vehicle width direction along an inner surface of the rear end panel 18 and is separately disposed above the left rear side frame 16 and the right rear side frame 16 (see also FIG. 3).

That is, a left end portion 19a of the rear end cross member 19 is separately disposed above the left rear side frame 16. A right end portion 19b of the rear end cross member 19 is disposed above the right rear side frame 16.

Returning to FIG. 3, the rear end cross member 19 includes a first member 46, a second member 47, a first member flange 48, and a second member flange 49. The first member 46 is vertically disposed above the lower joining portion 42 to face the vertical wall portion 45. The first member flange 48 is formed at a lower end portion of the first member 46. The first member flange 48 is joined to the lower joining portion 42 from the vehicle body front side.

The second member 47 is horizontally bent from an upper end portion of the first member 46 toward the vehicle body rear side.

The second member flange 49 extends upward from a rear end portion of the second member 47 along the upper joining portion 43. The second member flange 49 is joined to the upper joining portion 43 from the vehicle body front side. The rear end cross member 19 is formed to have an L-shaped cross section with the first member 46 and the second member 47.

Therefore, when the rear end cross member 19 is joined to the end panel upper portion 38, a closed cross section is formed by the end panel upper portion 38 and the rear end cross member 19.

An internal space 52 is formed by the closed cross section.

Since the rear end cross member 19 and the end panel upper portion 38 are formed to have a closed cross section, rigidity of the rear end cross member 19 is secured.

Figure 4:
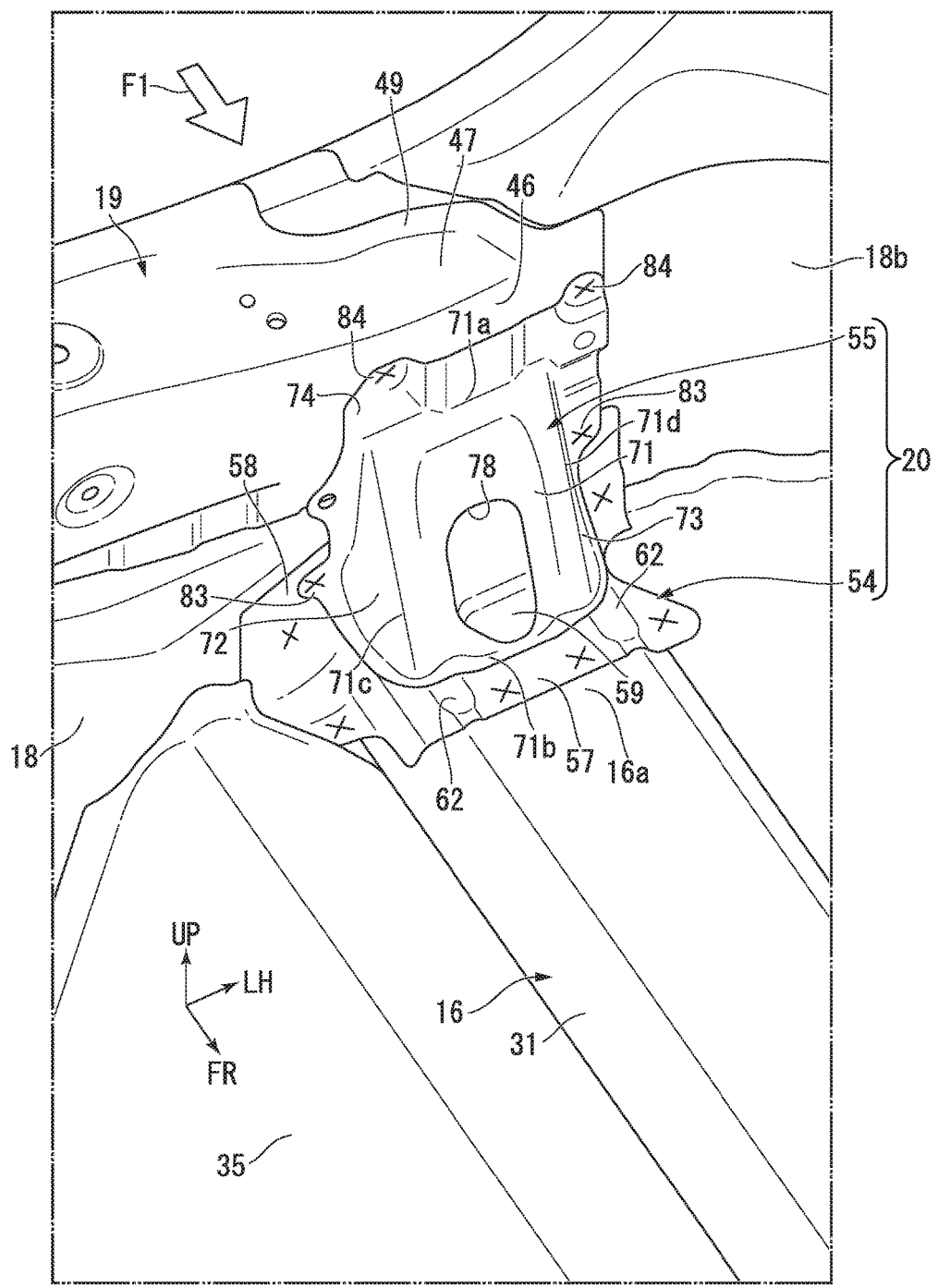
FIG. 4 is a perspective view illustrating an enlarged state of a portion IV of FIG. 1 in the first embodiment of the present invention.

As illustrated in FIGS. 3 and 4, the rear side frame 16, the rear end panel 18, and the rear end cross member 19 are connected by the rear gusset 20. The rear gusset 20 includes a first gusset 54 and a second gusset 55.

The first gusset 54 is connected to the rear side frame 16 and the rear end panel 18. The first gusset 54 includes a first gusset horizontal portion 57, a first gusset vertical portion 58, and a first gusset connecting portion 59. The first gusset vertical portion 58 is connected to a rear end portion of the first gusset horizontal portion 57 via the first gusset connecting portion 59. The first gusset 54 is formed to have an L-shaped cross section with the first gusset horizontal portion 57, the first gusset vertical portion 58, and the first gusset connecting portion 59.

The first gusset horizontal portion 57 is horizontally disposed along a rear end portion 31a of the upper member 31 of the rear side frame 16. The first gusset horizontal portion 57 is joined to the rear end portion 31a of the upper member 31 by spot welding, for example. A pair of horizontal beads 62 (see also FIG. 5) are formed at both side portions of the first gusset horizontal portion 57 at an interval in the vehicle width direction. The horizontal beads 62 are bulged upward and extend in a front-rear direction of the vehicle body along the first gusset horizontal portion 57.

The first gusset vertical portion 58 is disposed along a panel lower portion 18c of the rear end panel 18 on a lower side of the rear end cross member 19. The first gusset vertical portion 58 is joined to the panel lower portion 18c, for example, by spot welding or a bolt 64 and a nut 65. The first gusset vertical portion 58 and the first gusset horizontal portion 57 are connected by the first gusset connecting portion 59.

The first gusset 54 is connected to the rear side frame 16 and the rear end panel 18. That is, the rear end portion 31a of the upper member 31 of the rear side frame 16 and the rear end panel 18 are reinforced by the first gusset 54.

Here, the first gusset vertical portion 58 is joined to the panel lower portion 18c. The panel lower portion 18c is a lower portion of the rear end cross member 19. The first gusset 54 is joined to a portion other than the rear end cross member 19. Therefore, an impact load F1 input to the rear end portion 16a of the rear side frame 16 due to a light collision can be prevented from being transmitted to the rear end cross member 19 via the first gusset 54.

Therefore, it possible to prevent the impact load F1 input to the rear end portion 16a of the rear side frame 16 from being transmitted to the rear fender 39 (see FIG. 1) via the first gusset 54 and the rear end cross member 19.

Accordingly, the deformation of the rear fender 39 due to the impact load F1 input to the rear end portion 16a of the rear side frame 16 due to a light collision can be prevented. As described above, the first gusset 54 can mainly contribute against the impact load F1 input by a rear collision.

The second gusset 55 is provided above the first gusset 54. The second gusset 55 is connected to the first gusset horizontal portion 57 and the first member 46 of the rear end cross member 19. More specifically, the second gusset 55 includes a gusset inclined portion 71, a gusset inner wall portion 72, a gusset outer wall portion 73, and a gusset flange 74.

The gusset inclined portion 71 is formed to have a descending gradient toward the vehicle body front side from the first member 46 of the rear end cross member 19 to the first gusset horizontal portion 57. The gusset inclined portion 71 includes an inclined upper side 71a, an inclined lower side 71b, an inclined inner side 71c, and an inclined outer side 71d, and is formed in a rectangular shape in a plan view by the sides 71a to 71d.

Figure 5:
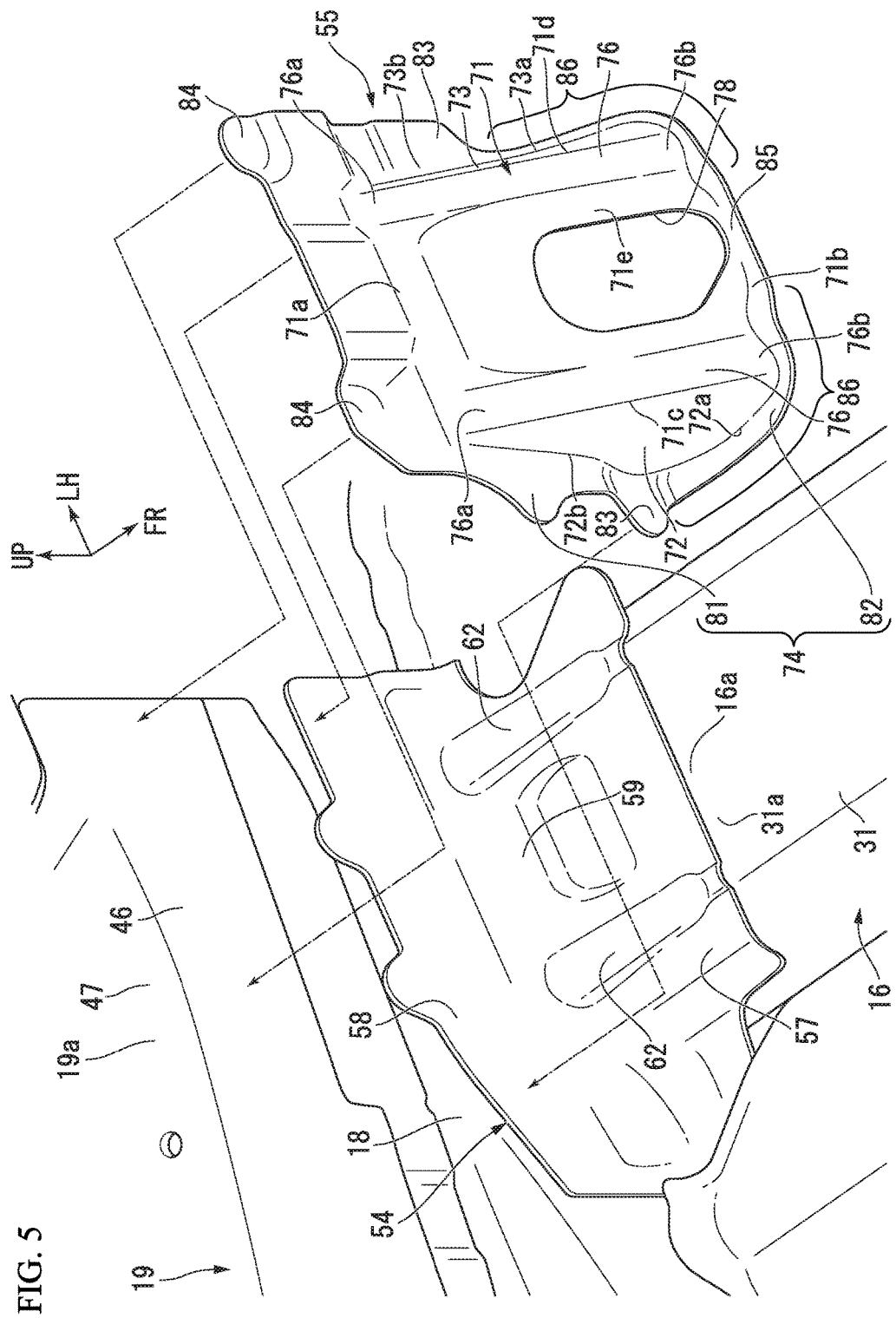
FIG. 5 is an exploded perspective view illustrating a state in which a second gusset is disassembled from a first gusset in FIG. 4 of the vehicle body rear portion structure in the first embodiment of the present invention.
Figure 6:
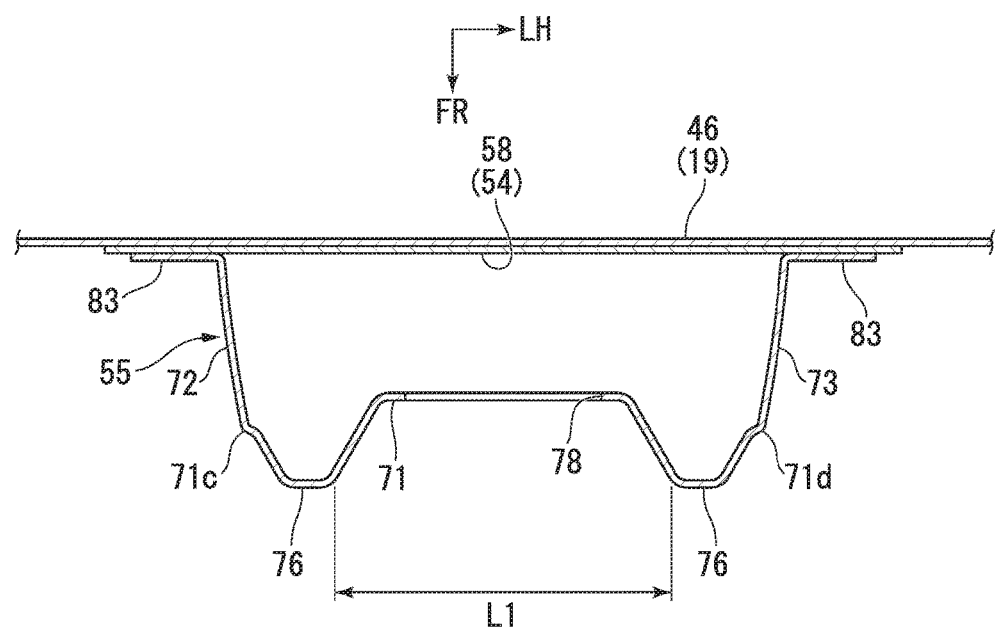
FIG. 6 is a cross-sectional view taken along line VI-VI of FIG. 2 in the first embodiment of the present invention.

As illustrated in FIGS. 5 and 6, the gusset inclined portion 71 includes two longitudinal beads 76 and an opening 78. The longitudinal beads 76 are bulged toward the front side and upward side of the vehicle and are formed along the inclined inner side 71c and the inclined outer side 71d. That is, the longitudinal beads 76 are disposed at an interval L1 in the vehicle width direction and extend obliquely in the vertical direction. The longitudinal beads 76 have rigidity secured against bending in the vehicle width direction.

In the gusset inclined portion 71, the opening 78 is provided between the two longitudinal beads 76 and in a lower half portion 71e. The opening 78 is formed, for example, to have a longitudinally long hole.

The gusset inner wall portion 72 is bent from the inclined inner side 71c of the gusset inclined portion 71 toward the vehicle body rear side. The gusset inner wall portion 72 is formed in a triangular shape in a side view by the inclined inner side 71c of the gusset inclined portion 71, a first inner side 72a, and a second inner side 72b.

The gusset outer wall portion 73 is bent from the inclined outer side 71d of the gusset inclined portion 71 toward the vehicle body rear side. The gusset outer wall portion 73 is formed in a triangular shape in a side view by the inclined outer side 71d of the gusset inclined portion 71, a first outer side 73a, and a second outer side 73b.

The gusset flange 74 is formed on the inclined upper side 71a and the inclined lower side 71b of the gusset inclined portion 71, the first inner side 72a and the second inner side 72b of the gusset inner wall portion 72, and the first outer side 73a and the second outer side 73b of the gusset outer wall portion 73.

The gusset flange 74 includes a first flange 81 and a second flange (flange) 82.

The first flange 81 is formed in a U shape in a side view along the second inner side 72b of the gusset inner wall portion 72, the inclined upper side 71a of the gusset inclined portion 71, and the second outer side 73b of the gusset outer wall portion 73. Since the first flange 81 is formed along the inclined upper side 71a of the gusset inclined portion 71, the first flange 81 connects upper end portions 76a of the two longitudinal beads 76. The first flange 81 includes a pair of first joining portions 83 and a pair of second joining portions 84.

One of the pair of first joining portions 83 is formed on a lower portion of the first flange 81 on an inner side in the vehicle width direction and on the vehicle body rear side of the longitudinal beads 76. The other of the pair of first joining portions 83 is formed on a lower portion of the first flange 81 on an outer side in the vehicle width direction and on the vehicle body rear side of the longitudinal beads 76. That is, the pair of first joining portions 83 are formed at an interval in the vehicle width direction.

The pair of first joining portions 83 overlap the first gusset vertical portion 58 from the vehicle body front side. The pair of first joining portions 83 are joined to the first gusset vertical portion 58 and the panel lower portion 18c at an interval in the vehicle width direction, for example, by spot welding.

One of the pair of second joining portions 84 is formed on an upper portion of the first flange 81 on the inner side in the vehicle width direction. The other of the pair of second joining portions 84 is formed on an upper portion of the first flange 81 on the outer side in the vehicle width direction.

The pair of second joining portions 84 overlap the first member 46 of the left end portion 19*a* of the rear end cross member 19 from the vehicle body front side. The pair of second joining portions 84 are joined to the first member 46 of the rear end cross member 19 at an interval in the front-rear direction of the vehicle body, for example, by spot welding.

The second flange 82 is connected to the pair of first joining portions 83 of the first flange 81. The second flange 82 is formed in a U shape in a plan view along the first inner side 72*a* of the gusset inner wall portion 72, the inclined lower side 71*b* of the gusset inclined portion 71, and the first outer side 73*a* of the gusset outer wall portion 73.

Since the second flange 82 is formed along the inclined lower side 71*b* of the gusset inclined portion 71, the second flange 82 connects lower end portions 76*b* of the two longitudinal beads 76.

Figure 7:
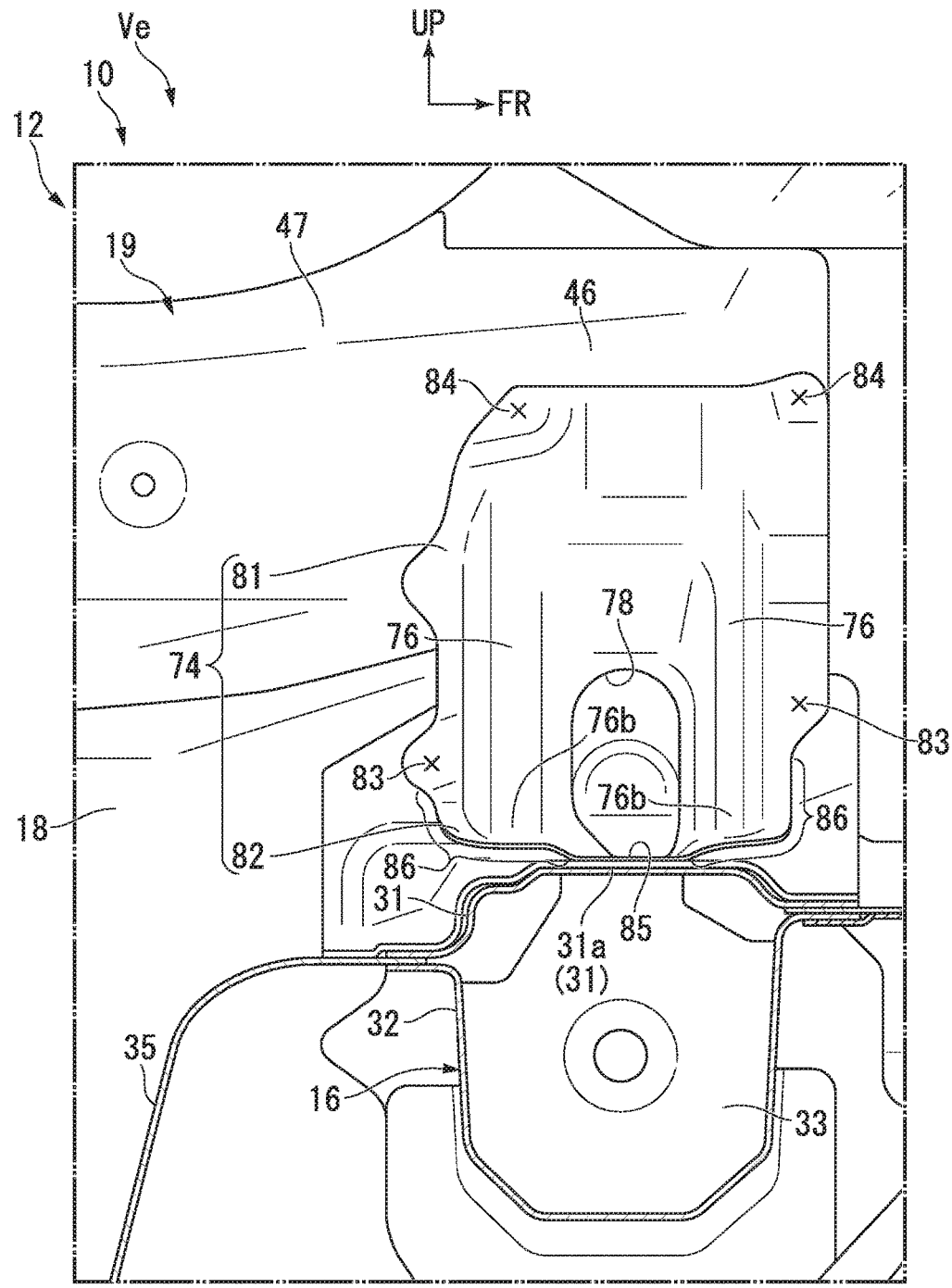
FIG. 7 is a cross-sectional view illustrating an enlarged state of a portion VII of FIG. 2 in the first embodiment of the present invention.

As illustrated in FIGS. 5 and 7, the second flange 82 forms a lower edge portion (edge portion) 85 of the opening 78. In the second flange 82, only a portion of the lower edge portion 85 of the opening 78 is in contact with the first gusset horizontal portion 57. In the second flange 82, a separated portion 86 other than the lower edge portion 85 is separated upward from the first gusset horizontal portion 57.

The lower edge portion 85 of the second flange 82 is joined to the first gusset horizontal portion 57 and the rear end portion 31*a* of the upper member 31 of the rear side frame 16, for example, by spot welding.

Further, the pair of second joining portions 84 are joined to the first member 46 of the rear end cross member 19 at an interval in the vehicle width direction, for example, by spot welding.

That is, the second gusset 55 is disposed above the first gusset 54, and the rear side frame 16 and the rear end cross member 19 are connected by the second gusset 55.

Further, the two longitudinal beads 76 are disposed at an interval in the vehicle width direction and extend obliquely in the vertical direction. The longitudinal beads 76 have rigidity secured against bending in the vehicle width direction.

Therefore, when torsional deformation or the like occurs in the vehicle width direction while a vehicle Ve is traveling, the relative displacement between the rear side frame 16 and the rear end cross member 19 can be prevented by the second gusset 55.

In addition, the pair of first joining portions 83 are joined to the first gusset vertical portion 58 and the panel lower portion 18*c* at an interval in the vehicle width direction, for example, by spot welding. Therefore, when torsional deformation or the like occurs in the vehicle width direction while the vehicle Ve is traveling, the relative displacement between the rear side frame 16 and the rear end cross member 19 can be prevented more satisfactorily by the second gusset 55.

As described above, the second gusset 55 can mainly contribute to the rigidity of the vehicle Ve while it is traveling.

Also, the opening 78 is provided between the two longitudinal beads 76. In the second gusset 55, rigidity between the two longitudinal beads 76 is suppressed due to the opening 78. Therefore, the rigidity of the second gusset 55 in the front-rear direction of the vehicle body can be suppressed with respect to the impact load F1 (see FIG. 4) input to the rear end portion 16*a* of the rear side frame 16 due to a light collision of the vehicle Ve. That is, the second gusset 55 can be bent in the front-rear direction of the vehicle body by the impact load F1 input to the rear end portion 16*a* of the rear side frame 16.

Thereby, the impact load F1 input to the rear end portion 16*a* of the rear side frame 16 can be prevented from being transmitted in the vehicle width direction along the rear end cross member 19.

As described above, since the first gusset 54 and the second gusset 55 are configured as separate members from each other, the roles of the first gusset 54 and the second gusset 55 can be divided. Thereby, it is possible to enhance rigidity when torsional deformation or the like occurs in the vehicle width direction while the vehicle Ve is traveling, and further, it is possible to prevent the deformation of the rear fender 39 (see FIG. 1).

Also, the lower end portions 76*b* of the two longitudinal beads 76 are connected by the second flange 82. Therefore, it is possible to further enhance the rigidity of the second gusset 55 against torsional deformation in the vehicle width direction. As a result, when torsional deformation or the like occurs in the vehicle width direction while the vehicle Ve is traveling, the relative displacement between the rear side frame 16 and the rear end cross member 19 can be further prevented.

Further, the pair of first joining portions 83 of the second gusset 55 are joined to the first gusset vertical portion 58 and the rear end panel 18 in the vehicle width direction. In addition, the second flange 82 is connected to the pair of first joining portions 83.

Therefore, the rigidity of the second flange 82 is enhanced by the pair of first joining portions 83. That is, the rigidity of the second gusset 55 is further enhanced against torsional deformation in the vehicle width direction. Thereby, when torsional deformation or the like occurs in the vehicle width direction while the vehicle Ve is traveling, the relative displacement between the rear side frame 16 and the rear end cross member 19 can be further prevented.

In addition, in the second flange 82, only the lower edge portion 85 of the opening 78 is joined to the first gusset horizontal portion 57 and the upper member 31 of the rear side frame 16. Therefore, the rigidity of the second gusset 55 in the front-rear direction of the vehicle body is suppressed with respect to the impact load F1 (see FIG. 4) input to the rear end portion 16*a* of the rear side frame 16 due to a light collision of the vehicle Ve. That is, the second gusset 55 can be bent in the front-rear direction of the vehicle body by the impact load F1 input to the rear end portion 16*a* of the rear side frame 16.

Thereby, the impact load F1 input to the rear end portion 16*a* of the rear side frame 16 can be prevented from being transmitted in the vehicle width direction along the rear end cross member 19.

Also, the lower edge portion 85 of the opening 78 is joined to the first gusset 54. Therefore, the rigidity of the second flange 82 is enhanced. That is, the rigidity of the second gusset 55 is further enhanced against torsional deformation in the vehicle width direction during traveling of the vehicle Ve. As a result, when torsional deformation or the like occurs in the vehicle width direction while the vehicle Ve is traveling, the relative displacement between the rear side frame 16 and the rear end cross member 19 can be further prevented.

Next, a vehicle body rear portion structure 100 of a second embodiment will be described on the basis of FIG. 8. In the vehicle body rear portion structure 100 of the second embodiment, constituent members the same as or similar to those in the vehicle body rear portion structure 12 of the first embodiment will be denoted by the same references, and detailed description thereof will be omitted.

Second Embodiment

Figure 8:
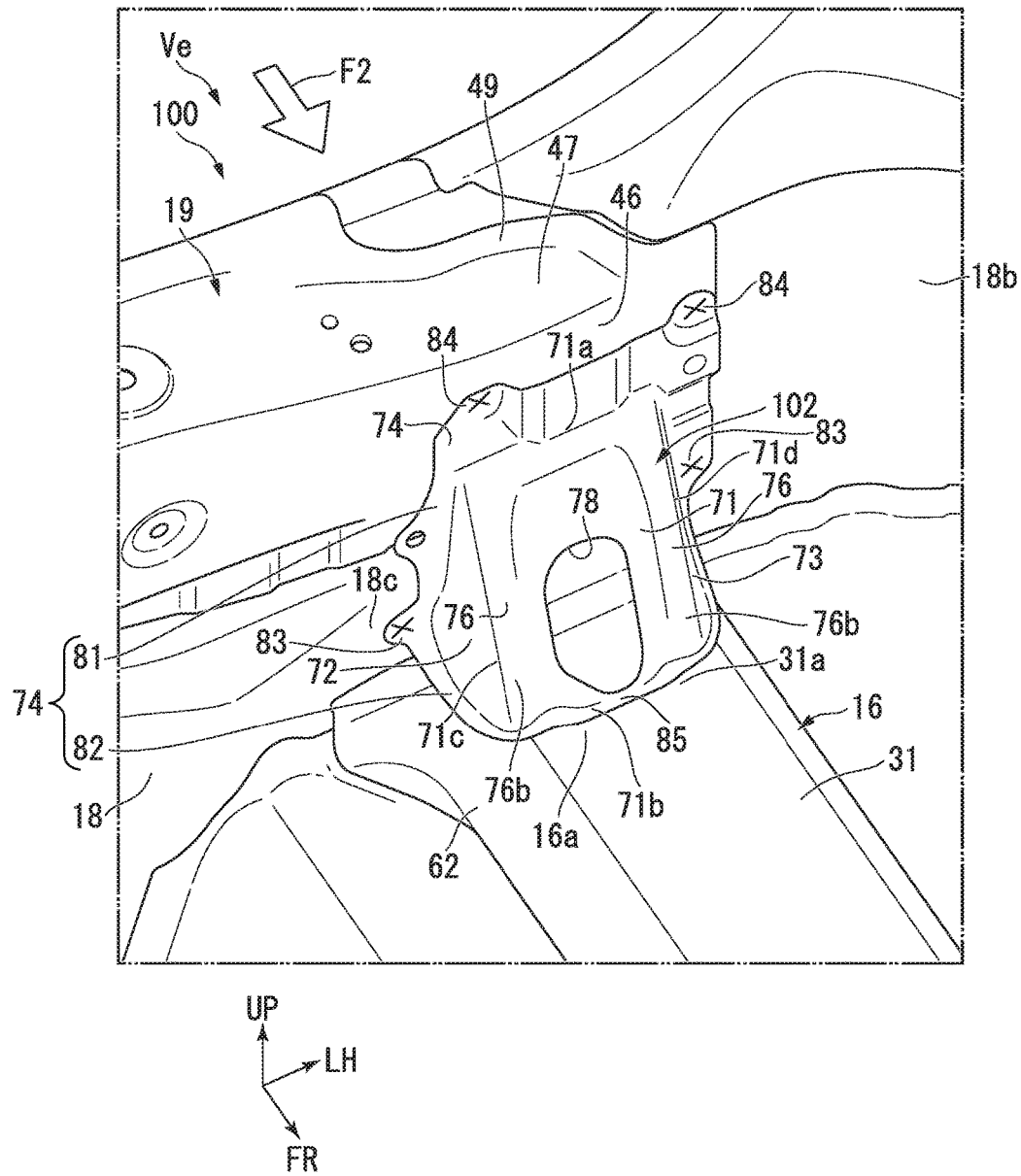
FIG. 8 is a perspective view illustrating a vehicle body rear portion structure in a second embodiment of the present invention.

As illustrated in FIG. 8, a gusset 102 in which the first gusset 54 is removed from the vehicle body rear portion structure 12 of the first embodiment is provided in the vehicle body rear portion structure 100, and other configurations are the same as those in the first embodiment.

The vehicle body rear portion structure 100 includes a rear end panel 18, a rear side frame 16, a rear end cross member 19, and a gusset 102.

The rear side frame 16 and the rear end panel 18 are connected by the gusset 102. In addition, the rear side frame 16 and the rear end cross member 19 are connected by the gusset 102.

As in the second gusset 55 of the first embodiment, the gusset 102 includes a gusset inclined portion 71, a gusset inner wall portion 72, a gusset outer wall portion 73, and a gusset flange 74. The gusset flange 74 includes a first flange 81 and a second flange 82.

A pair of first joining portions 83 of the first flange 81 are joined to a panel lower portion 18c at an interval in a vehicle width direction, for example, by spot welding. A pair of second joining portions 84 of the first flange 81 are joined to a first member 46 of the rear end cross member 19 at an interval in a front-rear direction of the vehicle body, for example, by spot welding.

In the second flange 82, only a lower edge portion 85 of an opening 78 is joined to an upper member 31 of the rear side frame 16 (specifically, a rear end portion 31a), for example, by spot welding.

Also, in the gusset 102, similarly to the second gusset 55 of the first embodiment, two longitudinal beads 76 are disposed at an interval in the vehicle width direction and extend obliquely in the vertical direction.

The two longitudinal beads 76 have rigidity secured against bending in the vehicle width direction. Therefore, when torsional deformation or the like occurs in the vehicle width direction while a vehicle Ve is traveling, the relative displacement between the rear side frame 16 and the rear end cross member 19 can be prevented.

Also, similarly to the second gusset 55 of the first embodiment, the opening 78 is provided in the gusset 102 between the two longitudinal beads 76. Therefore, rigidity between the two longitudinal beads 76 is suppressed due to the opening 78. That is, the gusset 102 can be bent in the front-rear direction of the vehicle body by an impact load F2 input to a rear end portion 16a of the rear side frame 16.

Thereby, the impact load F2 input to the rear end portion 16a of the rear side frame 16 can be prevented from being transmitted in the vehicle width direction along the rear end cross member 19. A rear fender 39 (see FIG. 2) can be prevented from being deformed due to the impact load F2 input to the rear end portion 16a of the rear side frame 16 due to a light collision of the vehicle Ve.

Also, lower end portions 76b of the two longitudinal beads 76 are connected by the second flange 82. Therefore, it is possible to further enhance the rigidity of the gusset 102 against torsional deformation in the vehicle width direction. Thereby, when torsional deformation or the like occurs in the vehicle width direction while the vehicle Ve is traveling, the relative displacement between the rear side frame 16 and the rear end cross member 19 can be further prevented.

Further, the pair of first joining portions 83 of the gusset 102 are joined to the rear end panel 18 in the vehicle width direction. Further, the second flange 82 is connected to the pair of first joining portions 83.

Therefore, the rigidity of the second flange 82 is enhanced by the pair of first joining portions 83. That is, the rigidity of the gusset 102 is further enhanced against torsional deformation in the vehicle width direction. As a result, when torsional deformation or the like occurs in the vehicle width direction while the vehicle Ve is traveling, the relative displacement between the rear side frame 16 and the rear end cross member 19 can be further prevented.

In addition, in the second flange 82, only the lower edge portion 85 of the opening 78 is joined to the upper member 31 of the rear side frame 16. Therefore, the rigidity of the gusset 102 in the front-rear direction of the vehicle body is suppressed with respect to the impact load F2 input to the rear end portion 16a of the rear side frame 16 due to a light collision of the vehicle Ve. That is, the gusset 102 can be bent in the front-rear direction of the vehicle body by the impact load F2 input to the rear end portion 16a of the rear side frame 16.

Thereby, the impact load F2 input to the rear end portion 16a of the rear side frame 16 can be prevented from being transmitted in the vehicle width direction along the rear end cross member 19.

Also, the lower edge portion 85 of the opening 78 is joined to the gusset 102. Therefore, the rigidity of the second flange 82 is enhanced. That is, the rigidity of the gusset 102 is further enhanced against torsional deformation in the vehicle width direction during traveling of the vehicle Ve. As a result, when torsional deformation or the like occurs in the vehicle width direction while the vehicle Ve is traveling, the relative displacement between the rear side frame 16 and the rear end cross member 19 can be further prevented.

The technical scope of the present invention is not limited to the above-described embodiments, and various modifications can be made without departing from the gist of the present invention.

For example, in the above-described embodiments, the example in which the opening 78 of the gusset inclined portion 71 is formed in the lower half portion 71e between the longitudinal beads 76 has been described, but the present invention is not limited thereto. As another example, it is possible to form the opening 78 in the entire region between the longitudinal beads 76. Also, it is also possible to form the opening 78 in an upper half portion between the longitudinal beads 76.

In the above-described embodiments, the example in which the opening 78 is formed to have a longitudinally long hole has been described, but a shape of the opening 78 can be arbitrarily selected. It is also possible to form a plurality of openings 78.

Further, in the above-described embodiment, the example in which the two longitudinal beads 76 of the second gusset 55 are bulged toward the front side and upward side of the vehicle has been described, but the present invention is not limited thereto. As another example, it is also possible to configure the longitudinal beads 76 to be bulged toward the rear side and downward side of the vehicle.

What is claimed is:
1. A vehicle body rear portion structure comprising:
a rear end panel;
a rear side frame which extends from the rear end panel toward a vehicle body front side; and
a rear end cross member which extends in a vehicle width direction along the rear end panel and is separately disposed above the rear side frame, wherein a first gusset connecting the rear side frame to the rear end panel and a second gusset connecting the rear side frame to the rear end cross member above the first gusset are provided.

2. The vehicle body rear portion structure according to claim 1, wherein the second gusset includes:
   two longitudinal beads disposed at an interval in the vehicle width direction and extending in a vertical direction; and
   an opening provided between the longitudinal beads.

3. The vehicle body rear portion structure according to claim 2, wherein the second gusset includes a flange connecting the longitudinal beads.

4. The vehicle body rear portion structure according to claim 3, wherein:
   the second gusset includes a pair of first joining portions joined to the first gusset in the vehicle width direction; and
   the flange is connected to the pair of first joining portions.

5. The vehicle body rear portion structure according to claim 3, wherein the flange forms an edge portion of the opening and is joined to the first gusset from the vertical direction only at the edge portion of the opening.

6. A vehicle body rear portion structure comprising:
   a rear end panel;
   a rear side frame which extends from the rear end panel toward a vehicle body front side; and
   a rear end cross member which extends in a vehicle width direction along the rear end panel and is separately disposed above the rear side frame, wherein:
   a gusset connecting the rear side frame to the rear end cross member is provided;
   the gusset includes two longitudinal beads extending in a vertical direction, an opening provided between the longitudinal beads in the vehicle width direction, and a flange connecting the longitudinal beads; and
   the flange forms an edge portion of the opening and is joined to the rear side frame from the vertical direction only at the edge portion of the opening.

7. The vehicle body rear portion structure according to claim 6, wherein:
   the gusset includes a pair of first joining portions joined to the rear end panel in a vehicle width direction; and
   the flange is connected to the pair of first joining portions.

* * * * *